(12) United States Patent
Coutinho et al.

(10) Patent No.: US 12,435,186 B2
(45) Date of Patent: Oct. 7, 2025

(54) AQUEOUS DISPERSIONS AND METHODS FOR PRODUCTION

(71) Applicant: SOLENIS TECHNOLOGIES, L.P., Wilmington, DE (US)

(72) Inventors: Cecil Coutinho, Wilmington, DE (US); Kate Lusvardi, Chadds Ford, PA (US); Frank Driessen, Vliermaalroot (BE)

(73) Assignee: Solenis Technologies, L.P., Wilmington, DE (US)

( * ) Notice: Subject to any disclaimer, the term of this patent is extended or adjusted under 35 U.S.C. 154(b) by 272 days.

(21) Appl. No.: 17/644,578

(22) Filed: Dec. 16, 2021

(65) Prior Publication Data

US 2023/0192967 A1 Jun. 22, 2023

(51) Int. Cl.
*C08J 3/05* (2006.01)
*C08J 3/18* (2006.01)
*C08K 5/00* (2006.01)
*C08K 5/05* (2006.01)

(52) U.S. Cl.
CPC . *C08J 3/05* (2013.01); *C08J 3/18* (2013.01); *C08K 5/0016* (2013.01); *C08K 5/05* (2013.01); *C08J 2333/02* (2013.01)

(58) Field of Classification Search
CPC ... C08J 3/05; C08J 3/18; C08J 2333/02; C08J 2333/08; C08J 2333/10; C08J 2323/08; C08K 5/0016; C08K 5/05
See application file for complete search history.

(56) References Cited

U.S. PATENT DOCUMENTS

| | | | |
|---|---|---|---|
| 5,206,279 A * | 4/1993 | Rowland | C08F 8/44 524/556 |
| 5,387,635 A | 2/1995 | Rowland et al. | |
| 5,591,806 A | 1/1997 | Recchia et al. | |
| 6,852,792 B1 * | 2/2005 | Capendale | C09D 133/02 524/556 |
| 10,576,721 B2 * | 3/2020 | Neagu | B32B 29/02 |
| 11,104,497 B2 * | 8/2021 | Lee | C11D 17/042 |
| 2008/0176968 A1 * | 7/2008 | VanSumeren | C08J 9/0061 521/97 |

(Continued)

FOREIGN PATENT DOCUMENTS

WO 2021047874 A1 3/2021

OTHER PUBLICATIONS

ISA/US, International Search Report and Written Opinion issued in Int. Appl. No. PCT/US2022/081723 mailed Jun. 1, 2023.

*Primary Examiner* — Robert S Jones, Jr.
*Assistant Examiner* — Zhen Liu
(74) *Attorney, Agent, or Firm* — Ingrassia Fisher & Lorenz, LLP

(57) ABSTRACT

High molecular weight ethylene (meth)acrylic acid (EAA) dispersions and methods for producing the same are provided. An exemplary method for producing a high molecular weight ethylene (meth)acrylic acid (EAA) dispersion includes mixing an ethylene/(meth)acrylic acid (EAA) copolymer, having a mass flow index (MFI) of no greater than about 300 g/10 min at 190° C. and 2.16 kg, and a base at a temperature of at least about 100° C. to form a molten phase in which the EAA copolymer is relaxed by the base. The exemplary method further includes mixing water with the molten phase at least until the molten phase disperses into the water to form the high molecular weight EAA dispersion.

20 Claims, 3 Drawing Sheets

(56) References Cited

U.S. PATENT DOCUMENTS

| | | |
|---|---|---|
| 2010/0008983 A1 | 1/2010 | Safadi et al. |
| 2013/0012632 A1 | 1/2013 | Ito et al. |
| 2013/0059972 A1 | 3/2013 | Hayes et al. |
| 2015/0203615 A1 | 7/2015 | Hayes |
| 2016/0024324 A1 | 1/2016 | Amici et al. |
| 2021/0292504 A1* | 9/2021 | de Zeeuw ................ C08J 7/052 |

* cited by examiner

AQUEOUS DISPERSIONS AND METHODS FOR PRODUCTION

TECHNICAL FIELD

The present disclosure relates to the field of producing aqueous dispersions. More particularly, the present disclosure relates to the production of an aqueous dispersion of a high molecular weight ethylene (meth)acrylic acid (EAA) copolymer.

BACKGROUND

Aqueous dispersions of an ethylene/unsaturated carboxylic acid copolymer represented by an ethylene/acrylic acid copolymer and/or an ethylene/methacryl acid copolymer have long been known, and various ones are commercially available. Among them, a dispersion in which such copolymers are dispersed in water using an alkali metal compound can be easily produced and has relatively mild restrictions on starting copolymers. Therefore, the dispersion obtained through such processing has been widely used.

However, known processes are typically limited to use with relatively lower molecular weight polymers. Certain products, such as barrier coatings, exhibit superior performance when formed with higher molecular weight polymers.

Accordingly, it is desirable to provide a method for producing a high molecular weight ethylene (meth)acrylic acid (EAA) dispersion. Further, it is desirable to provide an aqueous dispersion of a high molecular weight ethylene (meth)acrylic acid (EAA) copolymer. Furthermore, other desirable features and characteristics of embodiments will become apparent from the subsequent detailed description and the appended claims, taken in conjunction with the accompanying drawings and the foregoing technical field and background.

BRIEF SUMMARY

This summary is provided to introduce a selection of concepts in a simplified form that are further described below in the detailed description section.

High molecular weight ethylene (meth)acrylic acid (BAA) dispersions and methods for producing the same are provided.

In an exemplary embodiment, a method for producing a high molecular weight ethylene (meth)acrylic acid (EAA) dispersion includes mixing an ethylene/(meth)acrylic acid (EAA) copolymer, having a mass flow index (MFI) of no greater than about 300 g/10 min at 190° C. and 2.16 kg, and a base at a temperature of at least about 100° C. to form a molten phase in which the EAA copolymer is relaxed by the base. The exemplary method further includes mixing water with the molten phase at least until the molten phase disperses into the water to form the high molecular weight EAA dispersion.

In another exemplary embodiment, an aqueous dispersion of a high molecular weight ethylene (meth)acrylic acid (EAA) copolymer is provided. The aqueous dispersion includes from about 55 to about 65 wt. % water and from about 35 to about 45 wt. % EAA copolymer having a mass flow index (MFI) of no greater than 300 g/10 min at 190° C. and 2.16 kg.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein like reference numerals denote like elements, and wherein.

DETAILED DESCRIPTION

Figure 1:
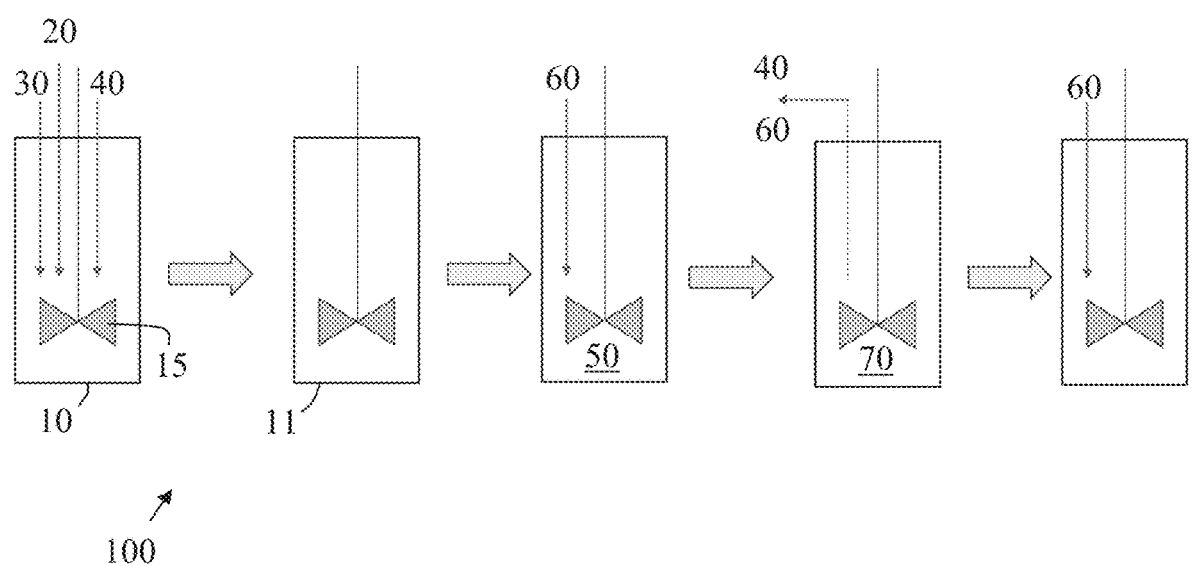
FIG. 1 is a schematic of a method for producing a high molecular weight ethylene (meth)acrylic acid (EAA) dispersion in accordance with various embodiments.

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the systems and methods defined by the claims. Furthermore, there is no intention to be bound by any expressed or implied theory presented in the preceding Technical Field, Background, or Brief Summary, or in the following Detailed Description. For the sake of brevity, conventional techniques and compositions may not be described in detail herein.

As used herein, "a," "an," or "the" means one or more unless otherwise specified. The term "or" can be conjunctive or disjunctive. Open terms such as "include," "including," "contain," "containing" and the like mean "comprising." All numbers in this description indicating amounts, ratios of materials, physical properties of materials, and/or use are to be understood as modified by the word "about," except as otherwise explicitly indicated. The term "about" as used in connection with a numerical value implicitly in the specification, and when used explicitly in the claims, denotes an interval of accuracy, familiar and acceptable to a person skilled in the art. In general, such interval of accuracy is #ten percent. Thus, "about ten" means nine to eleven. As used herein, the "%" described in the present disclosure refers to the weight percentage unless otherwise indicated.

The term "ethylene (meth)acrylic acid" is used herein to indicate both ethylene acrylic acid and ethylene methacrylic acid. Therefore, a method for producing a dispersion of ethylene acrylic acid copolymer and the resulting dispersion of ethylene acrylic acid copolymer are contemplated in embodiments herein. Likewise, a method for producing a dispersion of ethylene methacrylic acid copolymer and the resulting dispersion of ethylene methacrylic acid copolymer are contemplated in embodiments herein.

Exemplary embodiments herein provide for dispersions of ethylene (meth)acrylic acid copolymers that have a high molecular weight. As used herein "high molecular weight" refers to polymers that have a Melt Index Flow (MFI) of no more than 300 g/10 min at 190° C. and 2.16 kg (i.e., measured at 190° C. under a load of 2.16 kg in accordance with ASTM D 1238). Melt flow index (MFI) is a measurement that indicates a flowability of a polymer at high temperature. For all melt flow index (MFI) values recited herein, the melt flow index (MFI) is determined according to the test method of ASTM D-1238-04, Condition 190° C./2.16 kg. Melt flow rate is inversely proportional to the molecular weight of the polymer. Thus, the higher the molecular weight, the lower the melt flow rate, although the relationship is not linear.

Further, exemplary embodiments herein provide for dispersions of ethylene (meth)acrylic acid copolymers that have a high solids content. As used herein, a "high solids" dispersion is at least 35% solids. In certain embodiments, the dispersions of ethylene (meth)acrylic acid copolymers are at least 38% solids. It is believed that high solids dispersions exhibit significantly higher commercial value as compared to low solids dispersions.

Exemplary dispersions of ethylene (meth)acrylic acid copolymers may be useful for barrier coatings, size press formulations, primers, ink formulations, printing, flexible packaging, coatings, and sealants, as well as in other areas. For certain uses, the enhanced blocking properties provided by the high molecular weight EAA dispersions over low or moderate molecular weight counterparts.

Exemplary dispersions of ethylene (meth)acrylic acid copolymers have good consistency, such as a viscosity of from 500 to 5000 centipoise (cP) at ambient temperature.

Further, in an exemplary embodiment, a method uses a semi-batch process to produce a dispersion of high molecular weight EAA copolymer. The method includes heating a blend of high molecular weight EAA copolymer, a base, and, optionally, a plasticizer to an elevated temperature. After the EAA copolymer melts, the components are mixed together and the base reacts with the EAA copolymer in a neutralization reaction. After mixing for a selected during of time, the method continues with adding water to the molten phase of the copolymer at a slow rate. It is noted that the vessel remains at the elevated temperature and under elevated pressure such that the water remains in the liquid state. The molten phase and the liquid are mixed vigorously until the viscosity of the molten phase breaks-indicating the formation of the dispersion. Thereafter, the dispersion may be cooled, and the plasticizer, if present, may be stripped off.

In the semi-batch process, the order of the addition of components is critical in one regard. Specifically, while the EAA copolymer, base, and optional plasticizer may be added to one another in any order, the water must not be added until the EAA copolymer is melted and is relaxed or neutralized to form the molten phase.

If used, the plasticizer may be stripped off at any temperature after the dispersion is formed by dilution with water and vigorous mixing.

Figure 2:
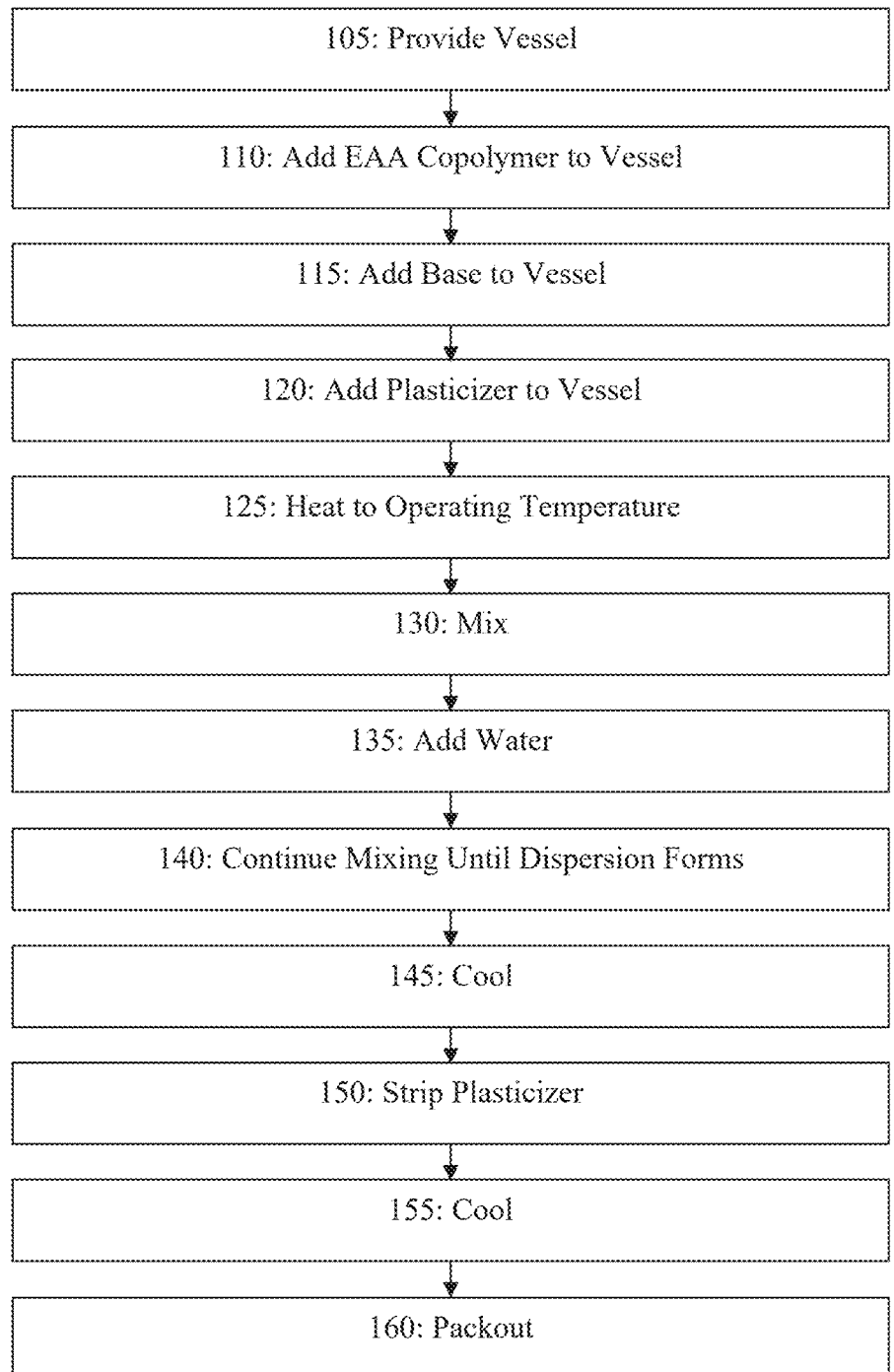
FIG. 2 is a flow chart of a method for producing a high molecular weight ethylene (meth)acrylic acid (EAA) dispersion in accordance with various embodiments.

Cross-referring FIGS. 1 and 2, a method 100 for producing a dispersion of an ethylene (meth)acrylic acid copolymer that has a high molecular weight is illustrated.

In an exemplary embodiment, a reactor vessel 10 is provided with a mixing mechanism 15, as indicated in action 105. An exemplary reactor vessel 10 may be sealed, pressurized, and heated to desired operating pressures and operating temperatures.

The method 100 includes adding a high molecular weight ethylene (meth)acrylic acid (EAA) copolymer 20 to the vessel 10, as indicated in action 110.

An exemplary EAA copolymer has a melt flow index (MFI) of no more than 300 g/10 min at 190° C. and 2.16 kg, such as no more than 250 g/10 min at 190° C. and 2.16 kg, such as no more than 200 g/10 min at 190° C. and 2.16 kg, such as no more than 150 g/10 min at 190° C. and 2.16 kg, such as no more than 120 g/10 min at 190° C. and 2.16 kg, such as no more than 110 g/10 min at 190° C. and 2.16 kg, such as no more than 100 g/10 min at 190° C. and 2.16 kg.

An exemplary BAA copolymer has a melt flow index (MFI) of at least 10 g/10 min at 190° C. and 2.16 kg, such as at least 20 g/10 min at 190° C. and 2.16 kg, such as at least 30 g/10 min at 190° C. and 2.16 kg, such as at least 40 g/10 min at 190° C. and 2.16 kg, such as at least 50 g/10 min at 190° C. and 2.16 kg, such as at least 60 g/10 min at 190° C. and 2.16 kg, such as at least 70 g/10 min at 190° C. and 2.16 kg, such as at least 80 g/10 min at 190° C. and 2.16 kg, such as at least 90 g/10 min at 190° C. and 2.16 kg.

An exemplary EAA copolymer has an ethylene:acrylic acid weight ratio of at least 70:30, such as at least 75:25, such as at least 78:22, such as at least 79:21, such as at least 80:20, such as at least 82:18, such as at least 84:16, such as at least 86:14, such as at least 88:12, such as at least 90:10, such as at least 92:8, such as at least 94:6.

An exemplary EAA copolymer has an ethylene:acrylic acid weight ratio of no more than 96:4, such as no more than 95:5, such as no more than 93:7, such as no more than 91:9, such as no more than 90:10, such as no more than 88:12, such as no more than 85:15, such as no more than 81:19.

In exemplary embodiments, the EAA copolymer is a solid, such as in the form of beads, pellets, or the like.

As shown, the method 100 further includes adding a base 30 to the vessel 10 at action 115. An exemplary base is dry. An exemplary base is in solid phase state. For example, an exemplary base is provided in dry flake form. An exemplary base is an alkali metal salt. An exemplary base is potassium hydroxide (KOH), such as in dry flake form.

The amount of base 30 added may depend on the ethylene:acrylic acid ratio of the EAA copolymer. For an EAA copolymer having an ethylene:acrylic acid ratio of 10:90, the amount of base added may be at a base:EAA copolymer ratio of 1:47. In exemplary embodiments, the base:EAA copolymer ratio is from 1:20 to 1:100.

Also, method 100 may optionally include adding a plasticizer 40 to the vessel 10 at action 120. In exemplary embodiments, the plasticizer 40 is a solvent, such as a polar protic solvent. In general terms, any solvent with a measurable dipole that contains a dissociable hydrogen atom is called a polar protic solvent. In exemplary embodiments, the plasticizer 40 is an alcohol. In exemplary embodiments, the plasticizer 40 is isopropyl alcohol (IPA) or ethanol.

Generally, the minimum amount of plasticizer 40 used in the method 100 is a function of the reactor operating temperature. For a given EAA copolymer, i.e., a copolymer having a known and fixed ethylene:acrylic acid ratio and a known and fixed molecular weight, increasing the operating temperature decreases the minimum amount of plasticizer needed. Likewise, for a selected EAA copolymer, there is an operating temperature at which plasticizer is no longer needed, i.e., the minimum amount of plasticizer is zero.

Further, the minimum amount of plasticizer used in the method may be viewed as a function of the acrylic acid:ethylene ratio of the EAA copolymer. Specifically, the lower the amount of acrylic acid (and higher the amount of ethylene), the more plasticizer is needed to solvate the EAA copolymer at a given operating temperature. This relationship can be seen when comparing the minimum amount of plasticizer for two EAA copolymers, one with 10% acrylic acid/90% ethylene and one with 15% acrylic acid/85% ethylene, at a given operating temperature. For the EAA copolymer having less acrylic acid, the ratio of plasticizer to copolymer may be about 0.6 at the given operating temperature, while the ratio of plasticizer to copolymer for the copolymer having more acrylic acid may be about 0.4 at the same operating temperature. Of course, a same ratio of plasticizer to copolymer (0.6) may be used for the copolymer having more acrylic acid if the operating temperature is decreased.

The order of adding the EAA copolymer 20, base 30, and optional plasticizer 40 is not critical. Thus, actions 110, 115, and 120 may be performed in any order relative to one another.

As shown, method 100 further includes heating the vessel 10, and the components therein, to define a heated reactor vessel 11 at a selected operating temperature at action 125. In an exemplary embodiment, the selected operating temperature is at least 100° C. In exemplary embodiments, the selected operating temperature is at least 110° C., such as at least 120° C., such as at least 130° C., such as at least 140° C., such as at least 150° C., such as at least 160° C., such as at least 170° C., such as at least 180° C., such as at least 190° C., such as at least 200° C.

In exemplary embodiments, the selected operating temperature is at most 210° C., such as at most 205° C., such as at most 195° C., such as at most 185° C., such as at most 175° C., such as at most 165° C., such as at most 155° C., such as at most 145° C., such as at most 135° C., such as at most 125° C., such as at most 115° C., such as at most 105° C.

Further, method 100 includes mixing the components within the reactor vessel 10 at action 130 for a selected duration of time after reaching the selected operating temperature. In an exemplary embodiment, the selected duration of time is from 5 to 180 minutes, such as from 30 to 150 minutes, such as for 30 minutes. In method 100, mixing is performed at the elevated operating temperature to form a molten phase 50 of the EAA copolymer in which the EAA copolymer is relaxed by the base. In embodiments in which a plasticizer is present, the EAA copolymer is solvated by the plasticizer, and the solvated EAA copolymer is relaxed by the base.

Whether plasticizer is present or not, the base relaxes the EAA copolymer through a neutralization reaction therebetween. If plasticizer is present, the neutralization reaction may occur at a lower temperature than if no plasticizer is present.

In an exemplary embodiment in which plasticizer is present, the base, the plasticizer, and the EAA copolymer are mixed at a temperature of from 120° C. to 165° C. to form the molten phase in which the EAA copolymer is solvated by the plasticizer and in which the EAA copolymer is relaxed by the base. In an exemplary embodiment in which no plasticizer is present, the method includes mixing the base and the ethylene/(meth)acrylic acid (EAA) copolymer at a temperature of at least 100° C., such as at a temperature of at least 150° C., such as at a temperature of at least 160° C., such as at a temperature of at least 170° C., such as at a temperature of at least 180° C., such as at a temperature of at least 190° C., to form the molten phase.

Method 100 further includes, at action 135, adding water 60 to the molten phase 50 of the EAA copolymer. In an exemplary embodiment, such addition of water is performed slowly, such as by drop, while mixing of the molten phase 50 continues.

Method 100 may include mixing water 60 and the molten phase 50 at action 140 for a selected duration of time. An exemplary duration of time is from 30 to 90 minutes, such as from 45 to 75 minutes, such as for 60 minutes.

Figure 3:
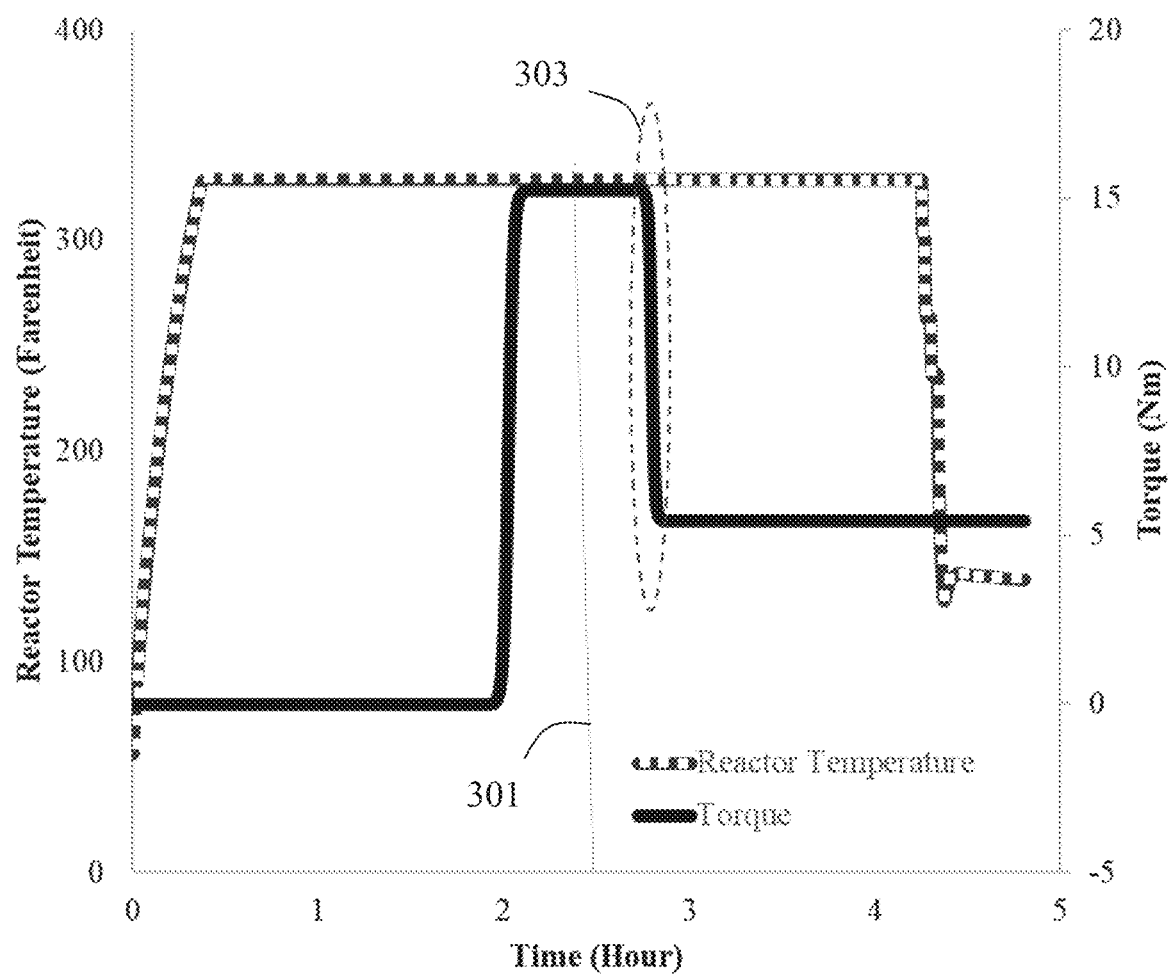
FIG. 3 is a graph illustrating the viscosity break indicating the transition of a molten phase to a dispersion in accordance with various embodiments.

Mixing may be discontinued when the viscosity of the BAA copolymer breaks, which is indicative of the formation of a dispersion. With reference to FIG. 3, a graph of EAA copolymer torque is presented as a function of reactor temperature and time of mixing with base and, optionally, plasticizer. As shown in FIG. 3, the reactor is initially at ambient temperature and the torque of the components before melting is zero. After heating for 120 minutes at a temperature of about 165° C., the torque quickly rises from zero to about 15 Newton meters (Nm), indicating the formation of the molten phase. At the line indicated by reference number 301, water was first added to the molten phase and the molten phase and added water were vigorously mixed. After twenty minutes of adding water and continued mixing, the viscosity breaks in the graphical area denoted by oval 303, dropping from 15 to about 5. This indicates that the molten phase has dispersed into the water to form a single-phase dispersion 70 of the high molecular weight EAA.

Method 100 may continue, at action 145, with cooling the vessel 10- and single-phase dispersion 70. For example, the vessel 10- and single-phase dispersion 70 may be cooled to a temperature of less than 100° C.

Further, method 100 may include stripping off the plasticizer 40, if present, from the dispersion 70 at action 150. In certain embodiments, stripping the plasticizer from the dispersion provides for a longer shelf life of the dispersion, particularly at higher storage temperatures, such as at 50° C. or higher. Action 150 may also include stripping some water 60 from the dispersion 70.

As shown, method 100 may continue with cooling the vessel 10 and dispersion 70 further at action 155. For example, the vessel 10 and dispersion 70 may be cooled to ambient temperature.

Thereafter, the dispersion 70 may be packed out at action 160, including adding water 60 to form the dispersion 70 with a desired water content, if necessary.

In certain embodiments, the EAA copolymer, the base, and the plasticizer, if present, define a volume, and method 100 includes, when forming the molten phase, limiting the amount of water in the volume to at most 10% (by weight), such as at most 8%, such as about most 6%, such as at most 4%, such as at most 2%, such as at most 1%, such as at most 0.5%, such as at most 0.1%, such as at most 0.01%, such as at most 0.001% (all by weight). In certain embodiments, no water is present in the vessel. Limiting the amount of water in the volume may include mixing no components including water before heating. Therefore, aqueous bases such as aqueous ammonium hydroxide should not be used as the base.

In certain embodiments, the high molecular weight EAA dispersion is high solids and includes 35 to 45 wt. % EAA copolymer and 55 to 65 wt. % water.

As described herein, a high molecular weight ethylene (meth)acrylic acid (EAA) dispersion is provided with a content of from 55 to 65 wt. % water and from 35 to 45 wt. % EAA copolymer having a mass flow index (MFI) of no greater than 300 g/10 min at 190° C. and 2.16 kg, both based on the total weight of the dispersion.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for producing a high molecular weight ethylene (meth)acrylic acid (EAA) dispersion, the method comprising:

mixing an ethylene/(meth)acrylic acid (EAA) copolymer having a mass flow index (MFI) of no greater than 300 g/10 min at 190° C. and 2.16 kg, a plasticizer, and a base in dry solid form at a temperature of at least about 100° C. to form a molten phase in which the EAA copolymer is solvated by the plasticizer and in which the EAA copolymer is relaxed by the base, wherein the base, the plasticizer, and the EAA copolymer define a volume;

limiting an amount of water in the volume to at most 0.1% by weight when forming the molten phase; and mixing water with the molten phase at least until the molten phase disperses into the water to form the high molecular weight EAA dispersion.

2. The method of claim 1, comprising mixing the base, the plasticizer, and the EAA copolymer at a temperature of from about 120° C. to about 165° C. to form the molten phase in which the EAA copolymer is solvated by the plasticizer and in which the EAA copolymer is relaxed by the base.

3. The method of claim 1, wherein the plasticizer is a polar protic solvent.

4. The method of claim 1, wherein the plasticizer is an alcohol.

5. The method of claim 1, wherein the plasticizer is an isopropyl alcohol (IPA) or ethanol.

6. The method of claim 1, wherein the amount of water in the volume is 0% by weight.

7. The method of claim 1, wherein the EAA copolymer has an MFI of no greater than about 200 g/10 min at 190° C. and 2.16 kg.

8. The method of claim 1, wherein the EAA copolymer has an MFI of no greater than about 100 g/10 min at 190° C. and 2.16 kg.

9. The method of claim 1, wherein the EAA copolymer has an ethylene:acrylic acid weight ratio of from about 84:16 to about 95:5.

10. The method of claim 1, wherein the EAA copolymer has an ethylene:acrylic acid weight ratio of from about 84:16 to about 90:10.

11. The method of claim 1, wherein the base is an alkali metal salt.

12. The method of claim 1, wherein the base is potassium hydroxide (KOH).

13. The method of claim 1, wherein no plasticizer is present when mixing the base and the ethylene/(meth)acrylic acid (EAA) copolymer at a temperature of at least about 100° C. to form the molten phase.

14. The method of claim 13, comprising mixing the base and the ethylene/(meth)acrylic acid (EAA) copolymer at a temperature of at least about 160° C. to form the molten phase.

15. The method of claim 1, wherein the amount of water in the volume is at most 0.01%.

16. The method of claim 1, wherein the amount of water in the volume is at most 0.001%.

17. The method of claim 1, wherein the base, the plasticizer, and the EAA copolymer are mixed in a reactor vessel in a semi-batch process to form the molten phase.

18. The method of claim 17, further comprising adding the water to the reactor vessel to before and while mixing the water with the molten phase in the reactor vessel.

19. The method of claim 17, further comprising maintaining the reactor vessel at a temperature of at most 155° C.

20. A method for producing a high molecular weight ethylene (meth)acrylic acid (EAA) dispersion, the method comprising:

mixing in a reactor vessel an ethylene/(meth)acrylic acid (EAA) copolymer having a mass flow index (MFI) of no greater than 300 g/10 min at 190° C. and 2.16 kg, a plasticizer, and a base in dry solid form at a temperature of at least about 100° C. to form a molten phase in which the EAA copolymer is solvated by the plasticizer and in which the EAA copolymer is relaxed by the base;

maintaining the reactor vessel with no water present while forming the molten phase; and adding water to the reactor vessel and mixing the water with the molten phase at least until the molten phase disperses into the water to form the high molecular weight EAA dispersion.

* * * * *